United States Patent [19]

Wigur

[11] Patent Number: 4,870,612
[45] Date of Patent: Sep. 26, 1989

[54] OPERATOR CONSOLE WITH PAIRED MODULES INCLUDING MEANS FOR CIPHERING AND DECIPHERING MESSAGES THEREBETWEEN BASED ON A MUTUALLY KNOWN, EXCLUSIVE INTERNAL SECURITY CODE

[75] Inventor: Jan Wigur, Norsborg, Sweden

[73] Assignee: Inter Innovation AB., Stockholm, Sweden

[21] Appl. No.: 121,034

[22] Filed: Nov. 16, 1987

[30] Foreign Application Priority Data

Dec. 15, 1986 [SE] Sweden ................ 8605381

[51] Int. Cl.⁴ .............. G06F 3/023; G06F 7/58; H04L 9/00
[52] U.S. Cl. .............. 364/900; 380/42; 380/46; 235/382; 235/382.5; 364/949.71; 364/928
[58] Field of Search ............. 235/382, 379, 380; 340/365 L; 364/200, 900, 200 MS File, 900 MS File, 717; 380/21, 23, 25, 29, 30, 37, 42–47

[56] References Cited

U.S. PATENT DOCUMENTS

| | | | |
|---|---|---|---|
| 3,911,429 | 10/1975 | Vinal | 340/365 L |
| 4,105,156 | 8/1978 | Dethloff | 235/441 |
| 4,215,421 | 7/1980 | Giraud | 364/900 |
| 4,238,854 | 12/1980 | Ehrsam et al. | 364/200 |
| 4,249,166 | 2/1981 | Schultz | 364/200 |
| 4,259,720 | 3/1981 | Campbell | 364/200 |
| 4,310,720 | 1/1982 | Check, Jr. | 364/900 |
| 4,315,101 | 2/1982 | Atalla | 235/379 |
| 4,352,952 | 10/1982 | Boone et al. | 364/200 |
| 4,430,728 | 2/1984 | Beitel et al. | 364/900 |
| 4,438,824 | 3/1984 | Mueller-Schloer | 178/22.08 |
| 4,507,651 | 3/1985 | Boll et al. | 340/365 L |
| 4,593,353 | 6/1986 | Pickholtz | 364/200 |
| 4,601,011 | 7/1986 | Grynberg | 364/900 |
| 4,604,708 | 8/1986 | Lewis | 364/900 |
| 4,614,861 | 9/1986 | Pavlov et al. | 235/380 |
| 4,672,572 | 6/1987 | Alsberg | 364/900 |

Primary Examiner—Eddie P. Chan
Assistant Examiner—Adolfo Ruiz
Attorney, Agent, or Firm—Simmons, Perrine, Albright & Ellwood

[57] ABSTRACT

An operator console for data communication is divided into two separate units which can be connected electrically together, namely a keyboard (10) having a logical unit (21), with a memory (211) and a ciphering/deciphering circuit (22), and a security module (11). Connected between the input side of the keyboard (10) and the memory (211) is a security circuit which disconnects a conduit (240) to the keyboard memory (211), subsequent to a first transfer of a code from the security module (11), and connects instead a conductor (241) to the memory (211) from the ciphering/deciphering circuit (22).

5 Claims, 1 Drawing Sheet

OPERATOR CONSOLE WITH PAIRED MODULES INCLUDING MEANS FOR CIPHERING AND DECIPHERING MESSAGES THEREBETWEEN BASED ON A MUTUALLY KNOWN, EXCLUSIVE INTERNAL SECURITY CODE

TECHNICAL FIELD OF THE INVENTION

The present invention relates to an operator console for data communication purposes, and more precisely to an operator console of the kind which includes a keybank, a logical unit which incorporates a memory circuit, and an enciphering and deciphering unit.

BACKGROUND OF THE INVENTION

Operator consoles intended, for example, for customer operated cash dispensers, with which a customer identifies himself as being authorized to withdraw a given sum of money by presenting an appropriate card, are known to the art. The dispenser receives, via the card, information stored in a magnetic medium in the card (customer data) and also, through the keyboard, information concerning the personal code of the customer (PIN-code). The customer data and PIN-code are evaluated in the logical unit of the dispenser and the result of this evaluation is decisive of whether or not the customer is entitled to receive cash through the dispenser. There is a general risk with such systems that unauthorized knowledge of the evaluation of customer data and PIN-code can be used to unlawful ends.

In known consoles of this kind the keyboard and logical unit, which incorporates the necessary algorithms and codes (ciphers) for carrying out the evaluation, are combined to form a single unit which, in order to be accessible to customers, is placed in an open location and not, as would be desirable from the aspect of safety, in a safety box. Consoles of the aforesaid kind may suffer one or more of the following drawbacks:

1. The console is equipped with a protective device which cuts-off the supply voltage in the event of a forced entry (burglary) but does not destroy the content of the memory in the logical unit.
2. The logical unit is not protected, by being located in a safety box or cabinet.
3. It is possible to intercept, or "eaves-drop" on PIN-codes sent from the keyboard to the logical unit.
4. Requisite programmes and codes are incorporated during manufacture of the console, which places high security demands on the prevention of unauthorized acquisition of manufacturing data, in order not to render the system vulnerable.

The object of the invention is to eliminate these drawbacks and similar disadvantages.

SUMMARY OF THE INVENTION

In accordance with the invention an operator console of the aforesaid kind is divided into two separate units, also referred to as "modules", capable of being electrically connected one to the other, namely a keyboard and a security module which incorporates a logical unit provided with a memory for programmes and codes and a random generator for generating at random the codes necessary to effect communication between the keyboard bank and the security module. This enables the keyboard to be placed in an external location where it is readily accessible to the customer, and the security module to be placed in a burglar-proof safety cabinet or box. The random generation of codes (master code) means that the manufacturing process need not be encumbered with rigorous security conditions. Subsequent to pairing together a keyboard and a security module and generating a master code necessary for co-action therebetween, an operator console is thereby provided whose parts can communicate only with one another. No known keyboard master code exists in the system. If either the keyboark or the security module should become unserviceable, e.g. as a result of being physically forced,it is necessary to pair together two new units to form a complete operator console.

These and other characteristic features of the invention will be apparent from the following drawings and description.

DESCRIPTION OF A PREFERRED EMBODIMENT

Figure 1:
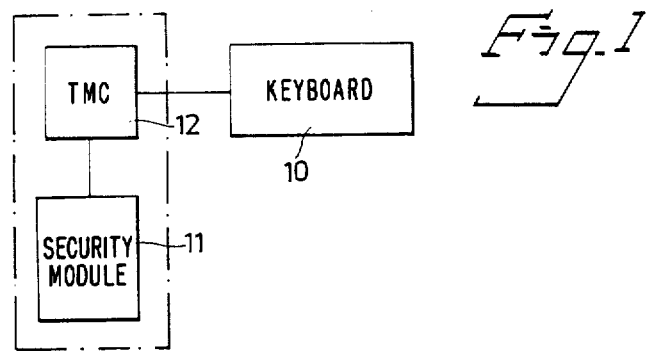
FIG. 1 is a block schematic illustrating an operator module equipped with keyboard and security module.

The operator console 10-11-12 illustrated schematically in FIG. 1 comprises two separate units, also referred to as "modules", which are capable of being coupled electrically one to the other, namely a keyboard module or 10 and a security moduel 11. The two modules or units 10 and 11 are coupled one to another via a transfer-monitoring circuit ("TMC") 12 which contains, inter alia, a main control programme for the automatics in the system, and also adapter circuits for signal conversion, when required.

The security module 11 and the circuit 12 are intended to be placed in a secured cabinet or box, whereas the keyboard 10 is placed in a location where it is freely accessible to, e.g., bank customers.

Figure 2:
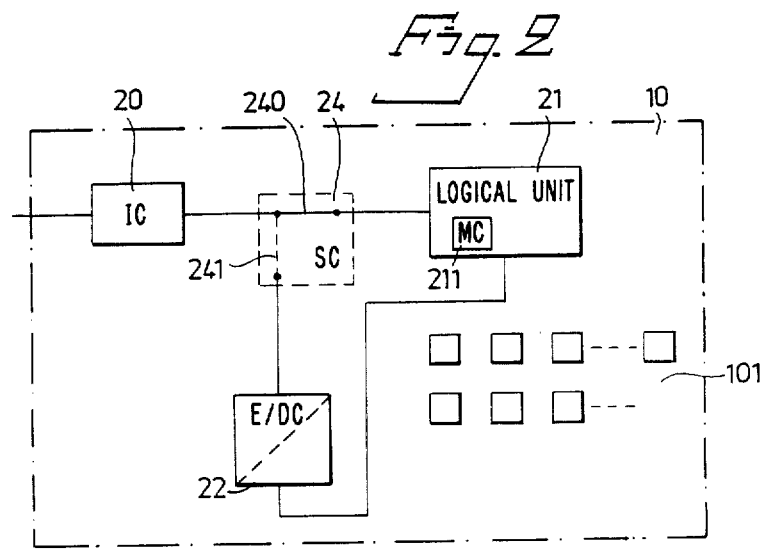
FIG. 2 is a more detailed illustation of the keyboard shown in FIG. 1.

As illustrated in FIG. 2, the keyboard 10 includes a bank of keys 101, an inptu circuit ("IC") 20, a logical unit 21 with memory circuit ("MC") 211, an enciphering/deciphering circuit ("EC/D") 22 and a security circuit ("SC") 24 having a first conductor 240 and a second conductor 241 (dotted line). The security circuit 24 is constructed to disconnect the circuit conduit 240 and to connect, instead the conductor 241 immediately subsequent to a first transfer of a code (master code) from the security module 11.

Figure 3:
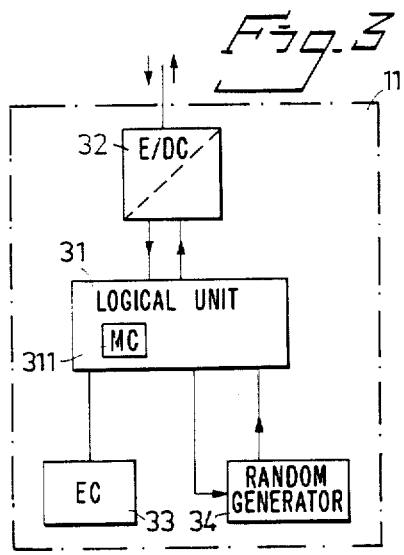
FIG. 3 is more detailed illustration of the security module shown in FIG. 1.

As shown in FIG. 3, the security module 11 includes a logical unit 31 incorporating a memory circuit ("MC") 311, an enciphering/deciphering circuit ("EC/D")=an evaluating circuit ("EC") 33 and a random generator 34 for randomly generating a code necessary for communication between the keyboard 10 and the security module 11.

During the manufacture of the keyboard 10, an "initial" master code is fed into the memory 211. The security circuit 24 is then activated, i.e. the conductor 240 is disconnected and the conductor 241 connected. This means that no new master code can be fed into the memory 211 without prior knowledge of the "initial" master code.

The keyboard 10 programmed with an "initial" master code is paired together with a security module 11, the random generator 34 of which is caused, upon command, to generate a randomly selected master code. This master code, which is unknown per se, is transferred with the aid of the known "initial" master code to the memory circuit 211 of the keyboard 10, where it replaces the "initial" master code. The new master code, which is exclusively internal in that it is known solely by the security module and the keyboard, is necessary for continued communication between the two units.

It is important that no "eaves dropping" can take place when pairing a keyboard with a security module, and that verification is obtained of the fact that the new (unknown) master code has actually been stored in the memory 211. Such verification is obtained by testing the communication between the units. Correct functioning of the communication in the intended manner is a verification of the fact that the new master code has been received. If communication does not function correctly, a new master code is transferred with the aid of the "initial" master code, this "initial" master code being known by the manufacturer and in probability is present in the memory circuit 211.

Normally, communication between the security module 11 and the keyboard 10 is established with the aid of a working code initially generated in the security module. The working code is changed in accordance with a given algorithm and is ciphered under the master code. The working code undergoes the algorithm for each "message", and the changed working code can be ciphered/deciphered under the old working code. This reduces the risk of the master code being stolen by some unauthorized person. The working code can be changed at suitable times (thus not only changed by the algorithm), newly created by the security module, and then ciphered under either the master code or under the old, changed working code for communication with the keyboard 10.

A new master code is generated and, together with the order "change code", communicated from the security module 11 in accordance with a programme inserted into the transfer - monitoring circuit 12. The new master code is then ciphered under the old master code. As beforementioned, information between the security module 11 and the keyboard 10 is carried by the circuit 12, which in accordance with its main programme does not change the contents of the message, but merely acts as a communication intermediary between the units.

A normal working cycle begins with an order to the keyboard 10 to read in a number of characters (e.g. from an inserted card and from the PIN-code entered on the keybank 101.) When the characters have been collected, ciphering is effected in the circuit 22 in accordance with an existing working code, and information is transmitted to the security module 11. Subsequent to the working code having been used once in this way, the code passes the algorithm and is changed thereby.

The security module 11 receives the ciphered characters and deciphers the same in the circuit 32 under the prevailing working code. The transmitted character message is evaluated in the evaluating circuit 33 (authorized or not-authorized), and the working code passes the algorithm (the same algorithm as that in the keyboard 10) and is changed therewith. The two units now have the same changed working code stored in their logical units.

Figure 4:
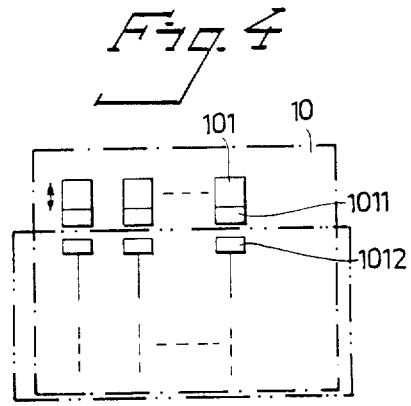
FIG. 4 illustrates a group of keys on the keyboard shown in FIG. 2.

In order to further protect the operator console against unauthorized "eaves-dropping", the keys 101 of the keyboard 10 (see FIG. 4) are provided with magnets 1011 which are arranged to activate individually associated magnetic sensors 1012, when the keys are activated externally. This will further safeguard the PIN-code during the transmission between respective keys and the keyboard in general.

The keyboard 10 is also equipped with a sensing circuit which, when sensing forced entry into the keyborad 10 (burglary), is intended to initiate an erasure process (or over-write) to erase (over-write) programmes and information stored in the logical unit 21 and the memory circuit 211 of the keyboard. This affords an additional safeguard for the master code and working code.

An operator console constructed in accordance with the invention affords the following advantages.

1. The security module 11 can be placed in a security cabinet as indicated in broken lines in FIG. 1 while the keyboard 10 is located in a position where it is readily accessible to the user. Security is enhanced in this way.

2. Un authorized eaves-dropping of the PIN-code is made extremely difficult.

3. Communication between keyboard 10 and security module 11 is effected with codes which are known solely by these two mutually co-acting units.

4. Keyboards 10 can be produced with known software, card layout and initial code without jeopardizing security. This enables keyboards to be manufactured at lower cost.

5. The combination of a keyboard 10 and a security module 11 to form an inseparable, co-acting pair of units enhances security.

6. The master code and working code in the keyboard 10 are supervised by an active anti-burglary device which when an attempt is made to forcibly enter the keyboard, will destroy the contents of the logical unit and the memory of the keyboard 10.

7. The keyboard 10 can be reset to its initial state, subsequent to changing the "initial" master code.

8. By using an automatically changing working code in the process of communication between keyboard and security module, unnecessary exposure of the master code which couples the units together for transmission purposes is avoided.

The aforementioned sensing circuit suitably comprises a winding, wound in closely adjacent turns (insulated) around the entire keyboard, with the exception of the uppermost parts of the keys. When the console is operative, the winding carries a weak current, and in the event of a break or fracture in the winding (e.g. caused by an attempt to break into the keyboard) the current is interrupted and the erasure process initiated therewith.

The sensing circuit can be made more effective by dividing the circuit into two part-windings connected in series and wound around the keyboard in two directions essentially at right angles to one another.

It is extremely important to obtain an effective guard between the upper, outer touch-surfaces of the keys and the remainder of the keyboard. This can be achieved in practice, e.g., in the following manner. The various components of the keyboard (logic components, sensors, battery, fuses) are mounted on two circuit cards, which are then positioned parallel with one another with the components facing one another. This circuit-card combination is then wrapped in a layer of shrink plastics, whereafter the winding (part-winding) is (are) wound around the plastics layer. A layer of molten plastics is then applied, and finally a further layer of shrink plastics.

I claim:

1. An operator console for enciphered data communication between two separately located modules thereof comprising a keyboard (10) for placement in a freely accessible location, and a security module (11) for placement in a secured location separate from said freely accessible location of said keyboard (10), said keyboard (10) and security module (11) being electrically coupled to each other for the transmission of character messages via a transfer-monitoring circuit (12), said transfer-monitoring circuit being adapted to contain a main system control programme in said operator console, the keyboard (10) including a multiple of keys (101), a logical unit (21) which incorporates a memory circuit (211) coupled to the logical unit (21), such logical unit (2) and memory circuit (211) coupled for respectively receiving and storing, a programme and information and for transmitting character messages of information in response to instructions from said programme, and a ciphering/deciphering circuit (22) for enciphering any such character messages of information received from said logical unit (21) and for deciphering any such character messages of information received from said security module (11) and then transmitted to said logical unit (21), and the security module (11) including a logical unit (31) which incorporates a memory (311), said logical unit (31) and said respective memory (311) coupled to receive and store, a programme and information and to transmit stored character messages of information, a ciphering/deciphering circuit (32) coupled to said logical unit (31) for enciphering any such character messages received from said logical unit (31) for transmission to the keyboard (10), and for deciphering any character messages received from the keyboard (10) for transmission to said logical unit (31) and a random generator (34) coupled to said logical unit (31) for generating a randomly selected code for storage in said memory (311) of said logical unit (311) and for inclusion in a character message transmitted from said security module (11) to said keyboard (10), said code selectively applied by the logical unit (31) to said ciphering/deciphering circuit (32) for enciphering a subsequent character message received from said logical unit (31) for transmission to the keyboard (10) or for deciphering a character message received from the keyboard (10) transmission to said logical unit (31), said enciphered character messages necessary for effecting enciphered communication between the keyboard (10) and the security module (11), said operator console characterized by a security circuit (24) located within the keyboard (10) and being electrically coupled to an input circuit (20) of the keyboard (10), to said logical unit (21) and to said ciphering/deciphering circuit (22), said security circuit including a first conductor (240) forming a breakable connection internally in said circuit (24) between said input circuit (20) and said logical unit (21), such that the breaking of the conductor (240) permanently disables a direct coupling between said input circuit (20) and said logical unit (21), said security circuit further including a second conductor (241) forming an initially open circuit connection internally in said security circuit (24) between said input circuit (20) and said ciphering/deciphering circuit (22), such connection of said second conductor (241) being made when said first conductor (240) is broken, such breaking and forming of said first and second conductors (240, 241) occurring immediatley subsequent to the transfer of an initial master code from the security module (11) to said logical unit (21) for storage in said memory circuit (211), such that said keyboard (10) and said security module (110) become paired together upon initially being coupled to each other by transmitting such initial master code of said security module (11) to said keyboard for storage in said memory circuit (211), and upon subsequent breaking and making of said first and second conductors, and upon activating said security module (11) to generate and transmit a random code to said keyboard (10), said random code replacing said initial master code in said security module (110 and said keyboard (10) and thereby becoming a new master code, whereby said keyboard (10) and security module (11) are paired together by said new master code for said encyphering and deciphering of character messages, said new master code existing exclusively within said keyboard (10) and said security module (11).

2. An operator console according to claim 1, characterized by a keyboard monitoring sensor-circuit being located in the keyboard (10), which, when sensing a forced entry into the keyboard by repeated attempts to enter false codes therein, is intended to initiate an erasure process for erasing the programme and information contained in the logical unit (21) and the memory circuit (211) of the keyboard (10).

3. An operator console according to claim 2, characterized in that the sensing circuit includes a winding of a current carrying conductor which is wound peripherally about an assembly of electrical components of the keyboard (10), excluding the upper portions of said keys (101), and embraces the entire keyboard with the exception of the uppermost touch-surfaces of the keys (101), and which is intended to initiate said erasure process upon the occurrence of a break or fracture in said winding owing to physical violence by an intruder.

4. An operator console according to claim 3, characterized in that the winding is divided into two series-connected part-windings which are wound around the keyboard in two mutually perpendicular directions, or at least substantially perpendicular directions.

5. An operator console according to claim 4, characterized in that the keys (101) of the keyboard (10) are provided with magnets (1011) which, when the keys are touched externally, activate magnetic sensors (1012) which are individual to each of the keys and which are located within the winding.

* * * * *